(12) United States Patent
Miyanaga

(10) Patent No.: US 12,403,536 B2
(45) Date of Patent: Sep. 2, 2025

(54) DIAMETER-ENLARGED HOLE PORTION FORMING DEVICE

(71) Applicant: KABUSHIKI KAISHA MIYANAGA, Miki (JP)

(72) Inventor: Masaaki Miyanaga, Miki (JP)

(73) Assignee: KABUSHIKI KAISHA MIYANAGA, Hyogo (JP)

( * ) Notice: Subject to any disclaimer, the term of this patent is extended or adjusted under 35 U.S.C. 154(b) by 1068 days.

(21) Appl. No.: 17/294,944

(22) PCT Filed: Oct. 3, 2019

(86) PCT No.: PCT/JP2019/039096
§ 371 (c)(1),
(2) Date: May 18, 2021

(87) PCT Pub. No.: WO2020/105291
PCT Pub. Date: May 28, 2020

(65) Prior Publication Data
US 2022/0016721 A1    Jan. 20, 2022

(30) Foreign Application Priority Data
Nov. 19, 2018   (JP) ................. 2018-216578

(51) Int. Cl.
B23B 51/00   (2006.01)
(52) U.S. Cl.
CPC ............... B23B 51/0045 (2013.01)

(58) Field of Classification Search
CPC ... B23B 51/0045; B23B 51/10; B23B 51/101; B23B 51/102; B23B 51/08; B28D 1/146;
(Continued)

(56) References Cited

U.S. PATENT DOCUMENTS 4,635,737 A  *  1/1987  Miyanaga ........... B23B 51/0045
                                                          175/286
4,768,599 A      9/1988  Eischeid
(Continued)

FOREIGN PATENT DOCUMENTS

CN        108025372 A        5/2018
EP         3006176 A1  *    4/2016 ........... B24B 19/009
(Continued)

*Primary Examiner* — Nicole N Ramos
(74) *Attorney, Agent, or Firm* — Alleman Hall & Tuttle LLP

(57) ABSTRACT

A device for forming a diameter-enlarged hole portion by cutting into a hole that is formed in a workpiece, the device including: a bow jaw including a shaft and a guide, the guide including a distal end surface and an sloped surface, the distal end surface being provided on an opposite side of the guide from the shaft, the sloped surface being sloped from the shaft side of the guide toward the distal end surface side of the guide in a direction away from a center axis of the shaft; and a cutter blade including a cutting portion whose distal end is provided with a cutting edge, the cutting portion being slidable along the sloped surface. The bow jaw further includes a suction passage that includes a flow passage, the flow passage including a suction port that is open at the distal end surface.

5 Claims, 9 Drawing Sheets

(58) Field of Classification Search
CPC ......... Y10T 408/858; Y10T 408/85884; Y10T 408/8595; Y10T 408/9065
See application file for complete search history.

(56) References Cited

U.S. PATENT DOCUMENTS

| | | | |
|---|---|---|---|
| 4,998,981 A | | 3/1991 | Miyanaga |
| 5,810,523 A | * | 9/1998 | Miyanaga ........... B23B 51/0045 408/180 |
| 9,950,445 B2 | * | 4/2018 | Miyanaga ........... B23B 51/0045 |
| 2016/0207222 A1 | | 7/2016 | Miyanaga |
| 2018/0339347 A1 | | 11/2018 | Lederle et al. |

FOREIGN PATENT DOCUMENTS

| | | | |
|---|---|---|---|
| EP | 3132903 A1 | | 2/2017 |
| FR | 2539072 A1 | * | 4/1983 |
| JP | 662249714 A | | 10/1987 |
| JP | 2598515 B2 | | 4/1997 |
| JP | 2564100 Y2 | | 3/1998 |
| JP | H1177662 A | | 3/1999 |
| JP | 2012071505 A | | 4/2012 |
| WO | 2015025492 A1 | | 2/2015 |

\* cited by examiner

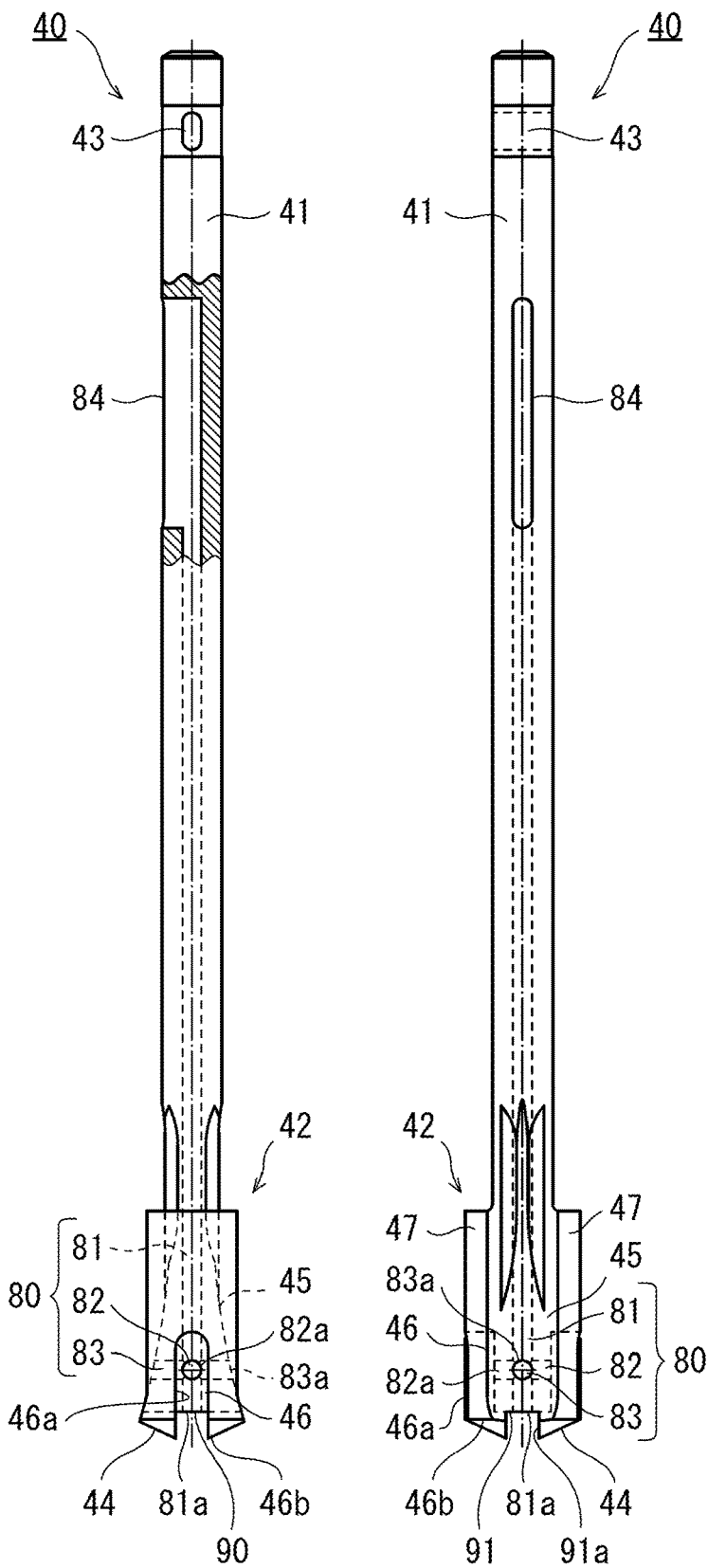
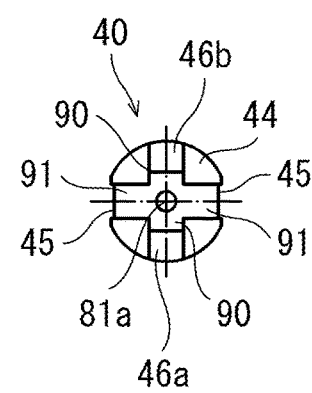
FIG. 5C
FIG. 5A    FIG. 5B

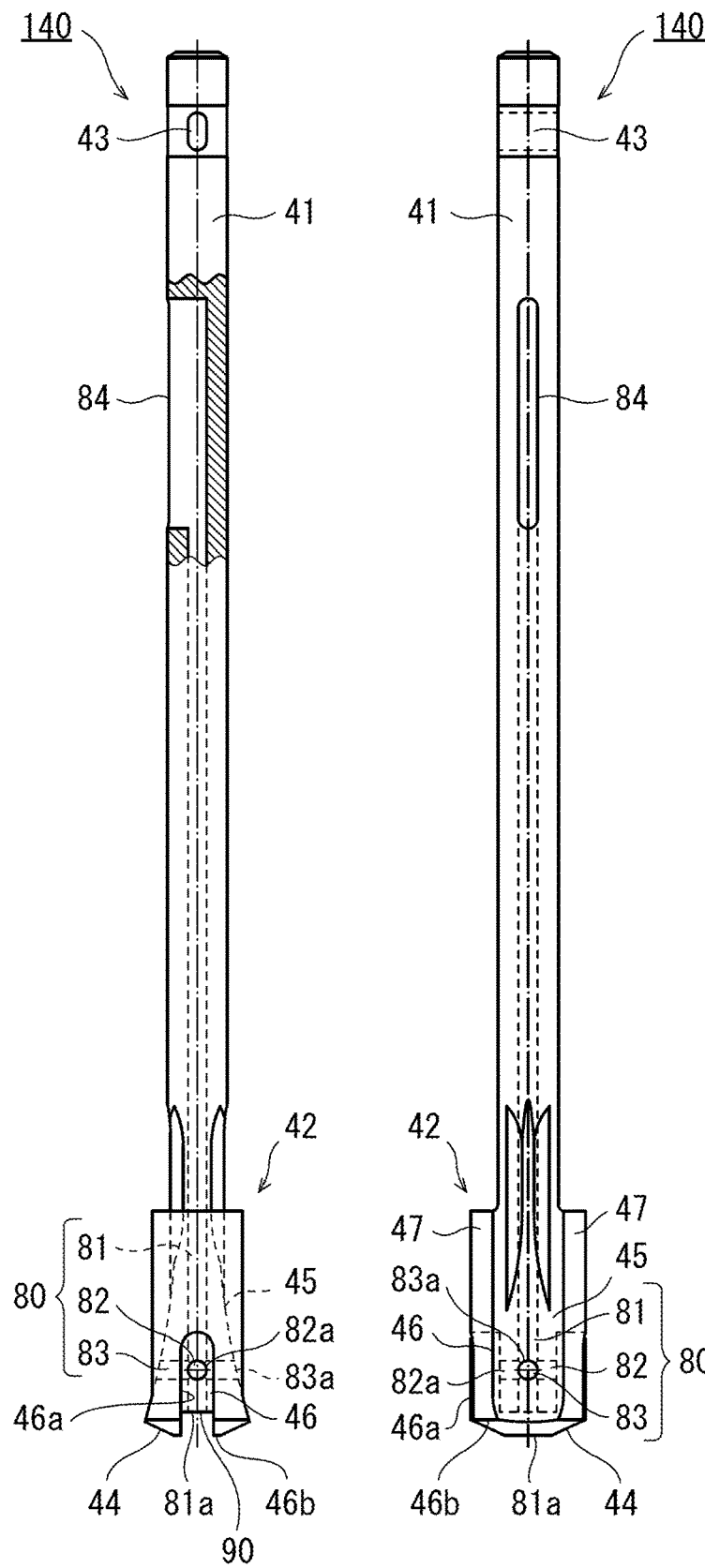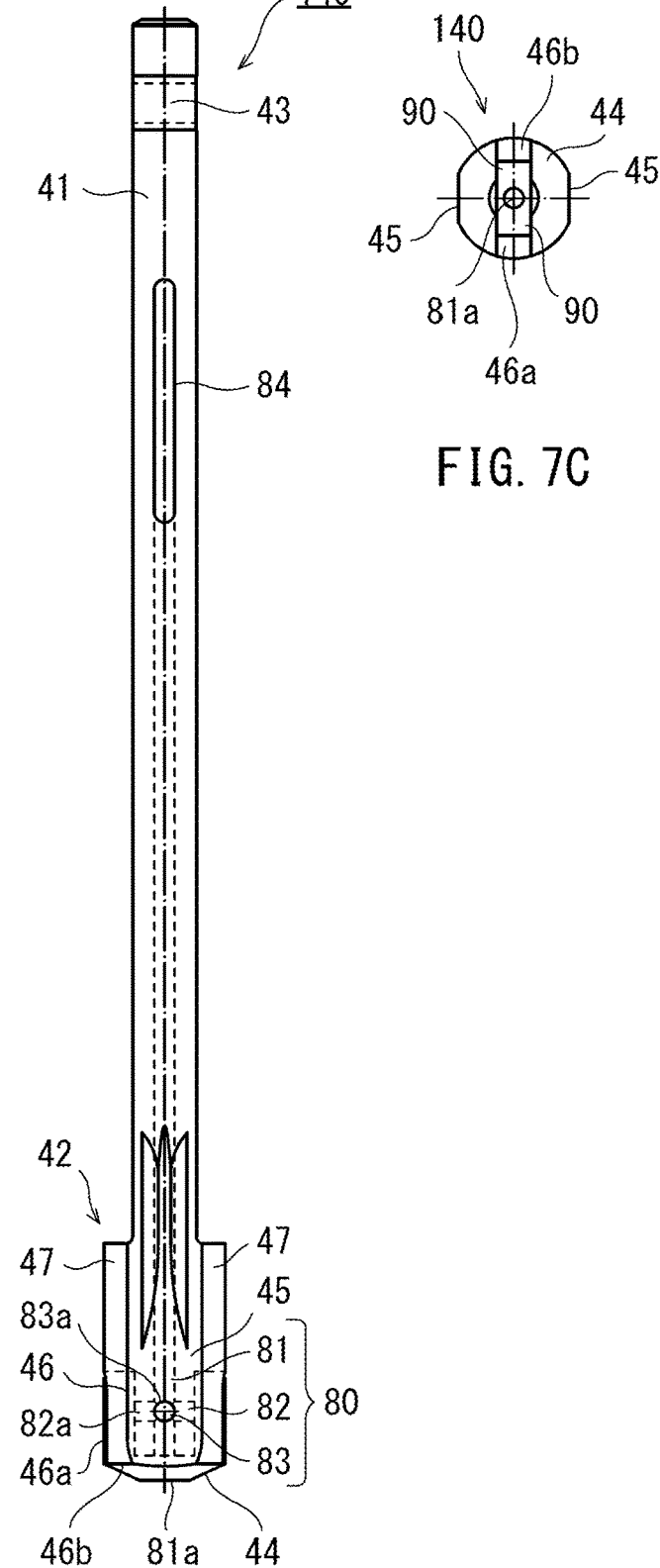
FIG. 7A  FIG. 7B  FIG. 7C

DIAMETER-ENLARGED HOLE PORTION FORMING DEVICE

TECHNICAL FIELD

The present invention relates to diameter-enlarged hole portion forming devices.

BACKGROUND ART

Patent Literature 1 discloses a known conventional diameter-enlarged hole portion forming device for forming a diameter-enlarged hole portion by cutting into an anchor bolt implanting hole. At the time of forming a diameter-enlarged hole portion by cutting into a hole wall by using the diameter-enlarged hole portion forming device of Patent Literature 1, a hole wall cutting blade of the device moves along a guide groove. As the hole wall cutting blade moves forward along the guide groove, the hole wall cutting blade protrudes toward the outer side of a guide head, thereby cutting into the hole wall to form a diameter-enlarged hole portion.

CITATION LIST

Patent Literature

PTL 1: Japanese Utility Model Registration No. 2564100

SUMMARY OF INVENTION

Technical Problem

In the case of the diameter-enlarged hole portion forming device of Patent Literature 1, powder dust is generated during the cutting by the hole wall cutting blade. The powder dust causes deterioration of the work environment, and if the powder dust enters between components of the diameter-enlarged hole portion forming device, it may cause malfunction of the device, wear of the components of the device, and deterioration in the performance of the diameter-enlarged hole portion forming device.

The present invention has been made in order to solve the above-described problems. An object of the present invention is to provide a diameter-enlarged hole portion forming device capable of efficiently removing the powder dust, for example, as a measure for preventing the scattering of the powder dust and reducing the exposure to the powder dust.

Solution to Problem

A diameter-enlarged hole portion forming device according to one aspect of the present invention is a diameter-enlarged hole portion forming device for forming a diameter-enlarged hole portion by cutting into a hole that is formed in a workpiece. The diameter-enlarged hole portion forming device includes: a bow jaw including a shaft and a guide, the guide including a distal end surface and an sloped surface, the distal end surface being provided on an opposite side of the guide from the shaft, the sloped surface being sloped from the shaft side of the guide toward the distal end surface side of the guide in a direction away from a center axis of the shaft; and a cutter blade including a cutting portion whose distal end is provided with a cutting edge, the cutting portion being slidable along the sloped surface. The bow jaw further includes a suction passage that includes a flow passage, the flow passage including a suction port that is open at the distal end surface.

According to the above configuration, during the cutting to form the diameter-enlarged hole portion, since the distal end surface is inserted in the deeper side of the hole, the powder dust that is generated due to the cutting is efficiently sucked in through the suction port of the distal end surface, and thereby the powder dust can be removed from the hole.

In the diameter-enlarged hole portion forming device, the guide may include: a pair of the sloped surfaces provided such that the center axis is interposed between the sloped surfaces; and a recess that is open at the distal end surface and an outer peripheral surface between the pair of the sloped surfaces.

According to the above configuration, the powder dust enters the recess through its opening at the outer peripheral surface. This makes it possible to prevent a situation in which: the powder dust gets caught between components of the diameter-enlarged hole portion forming device; and thereby malfunctioning of the diameter-enlarged hole portion forming device is caused and/or wear of the components is caused. Moreover, the powder dust that has entered the recess is led by the recess to its opening at the distal end surface, and then sucked in through the suction port of the distal end surface. In this manner, the powder dust can be efficiently removed by suction.

In the diameter-enlarged hole portion forming device, the suction passage may include a first branch passage that is branched off from the flow passage and that communicates with the recess.

According to this configuration, the powder dust that has entered the recess is sucked in through the suction port of the first branch passage, and thereby the powder dust can be removed efficiently.

In the diameter-enlarged hole portion forming device, the guide may include a first groove that is connected to the suction port and to an opening of the recess, the opening being formed at the distal end surface.

According to the above configuration, the powder dust that has entered the recess is led from the opening of the recess at the distal end surface to the suction port by the first groove, and sucked in through the suction port. In this manner, the powder dust can be efficiently removed by suction.

In the diameter-enlarged hole portion forming device, the suction passage may include a second branch passage that is branched off from the flow passage and that is open at the sloped surface.

According to the above configuration, the powder dust on the sloped surface can be sucked in through the suction port of the second branch passage, and thereby the powder dust can be removed efficiently.

In the diameter-enlarged hole portion forming device, the guide may include a second groove that is open at the sloped surface and that is connected to the suction port at the distal end surface.

According to the above configuration, the powder dust on the sloped surface is led to the suction port by the second groove, and thereby the powder dust can be removed efficiently by suction.

Advantageous Effects of Invention

The present invention is configured as described above, and has an advantageous effect of being able to provide a diameter-enlarged hole portion forming device that is capable of efficiently removing powder dust.

The above object, other objects, features, and advantages of the present invention will be made clear by the following detailed description of a preferred embodiment with reference to the accompanying drawings.

BRIEF DESCRIPTION OF DRAWINGS

FIG. 5A is a view of a bow jaw as seen from the recess side; FIG. 5B is a view of the bow jaw of FIG. 5A as seen from the sloped surface side; and FIG. 5C is a view of the bow jaw of FIG. 5A as seen from the distal end side.

FIG. 7A is a view, as seen from the recess side, of a bow jaw of the diameter-enlarged hole portion forming device according to Variation 1 of the embodiment of the present invention;

FIG. 7B is a view of the bow jaw of FIG. 7A as seen from the sloped surface side; and FIG. 7C is a view of the bow jaw of FIG. 7A as seen from the distal end side.

DESCRIPTION OF EMBODIMENTS

Embodiments

Figure 1A:
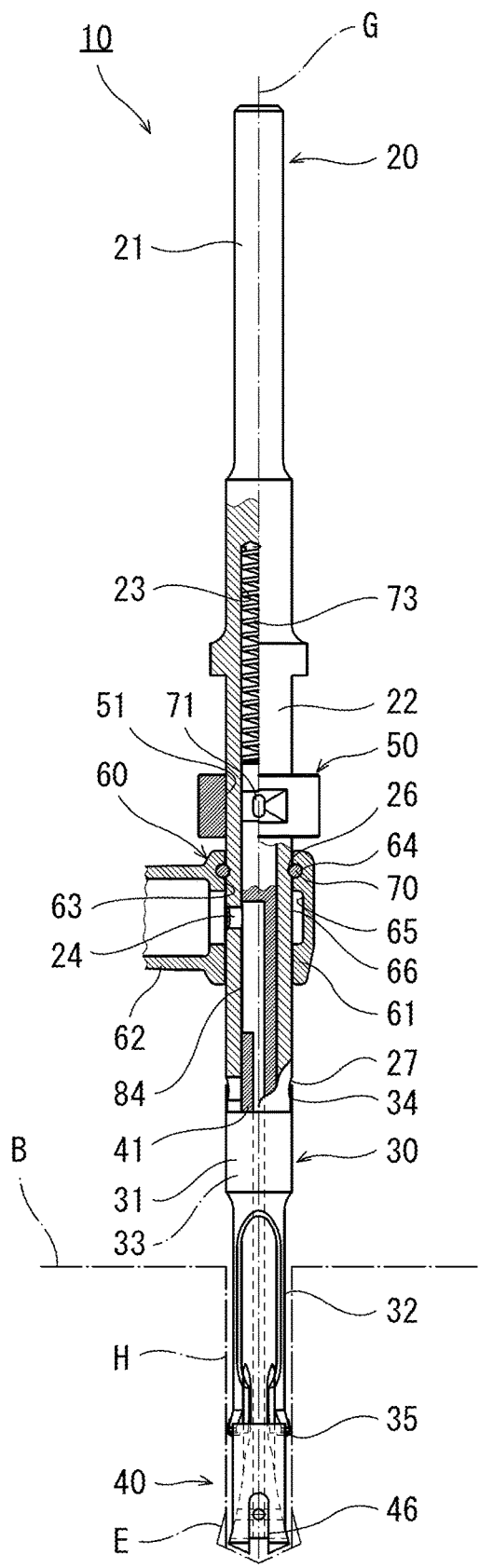
FIG. 1A is a view of a diameter-enlarged hole portion forming device according to an embodiment of the present invention as seen from a recess side.
Figure 1B:
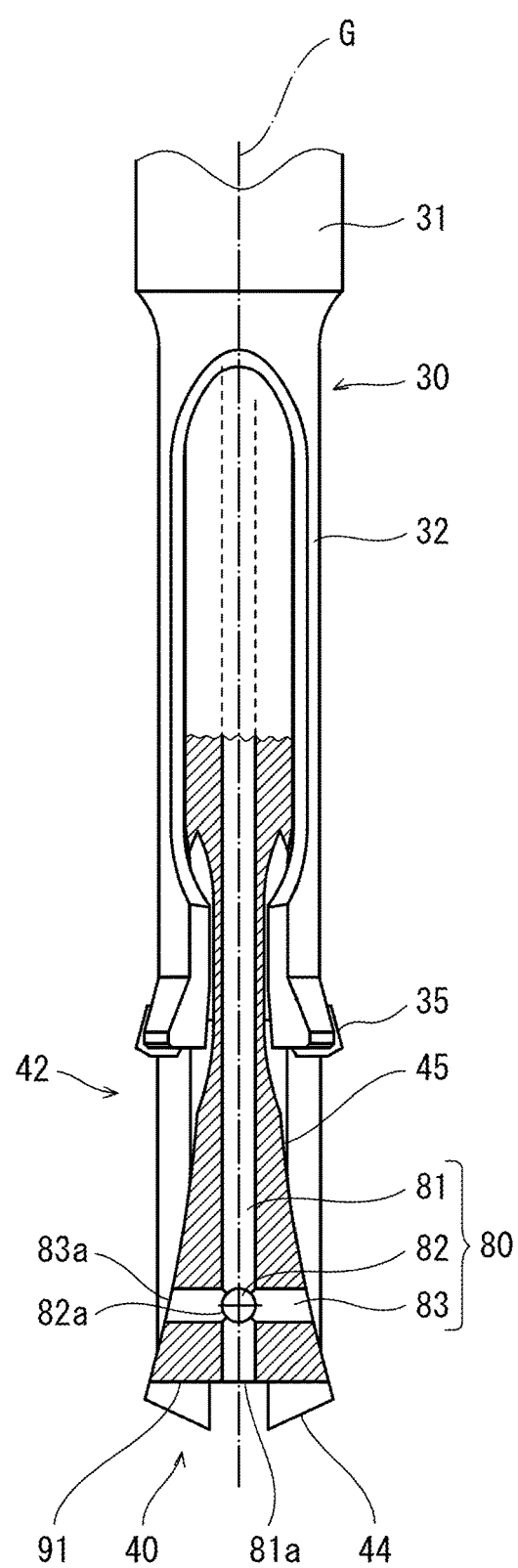
FIG. 1B is a fragmentary sectional view showing a part of the diameter-enlarged hole portion forming device of FIG. 1A.

<Configuration of Diameter-Enlarged Hole Portion Forming Device>

As shown in FIG. 1A to FIG. 2B, a diameter-enlarged hole portion forming device 10 according to an embodiment of the present invention is a cutting device for forming a diameter-enlarged hole portion E in a hole (a pre-formed hole H) that is pre-formed in a workpiece B.

The diameter-enlarged hole portion forming device 10 includes a shank 20, a cutter blade 30, and a bow jaw 40. The cutter blade 30 is coupled to the shank 20. The bow jaw 40 is inserted in a hole formed in the shank 20 and a hole formed in the cutter blade 30. The shank 20 and the bow jaw 40 are fixed to a stopper sleeve 50, and a suction adapter 60 is mounted to the shank 20.

It should be noted that the diameter-enlarged hole portion forming device 10 has a center axis G. The center axis G also serves as the center axis of each of the shank 20, the cutter blade 30, and the bow jaw 40, and is equivalent to a rotational axis about which each of the shank 20, the cutter blade 30, and the bow jaw 40 rotates. The diameter-enlarged hole portion forming device 10 has a distal end side and a proximal end side. In the description herein, the distal end side of the diameter-enlarged hole portion forming device 10 is defined as the side that is closer to the cutter blade 30 than the shank 20 is and that encompasses the cutter blade 30, and the other side of the diameter-enlarged hole portion forming device 10 is defined as the proximal end side. However, the arrangement of the diameter-enlarged hole portion forming device 10 is not limited to this.

<Configuration of Components>

Figure 3A:
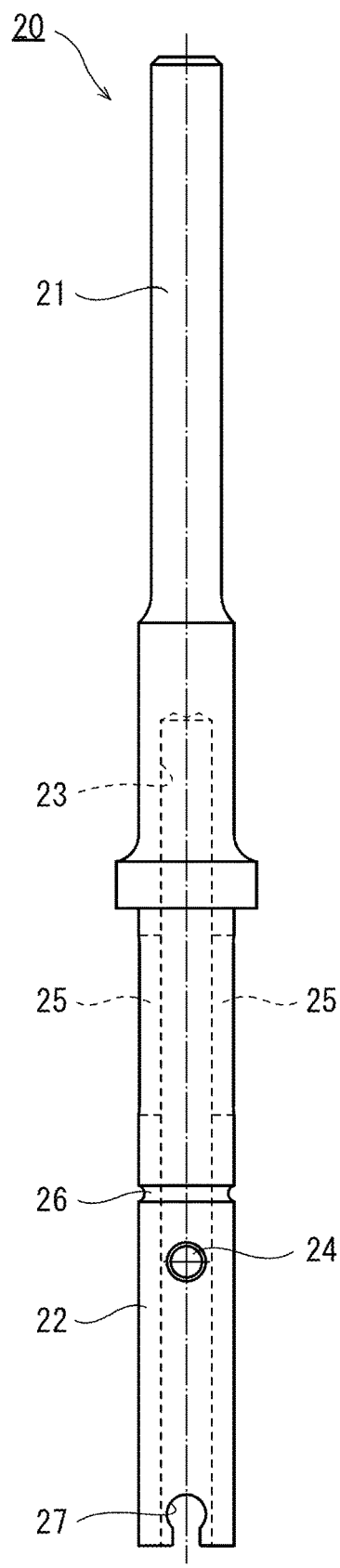
FIG. 3A is a side view of a shank.
Figure 3B:
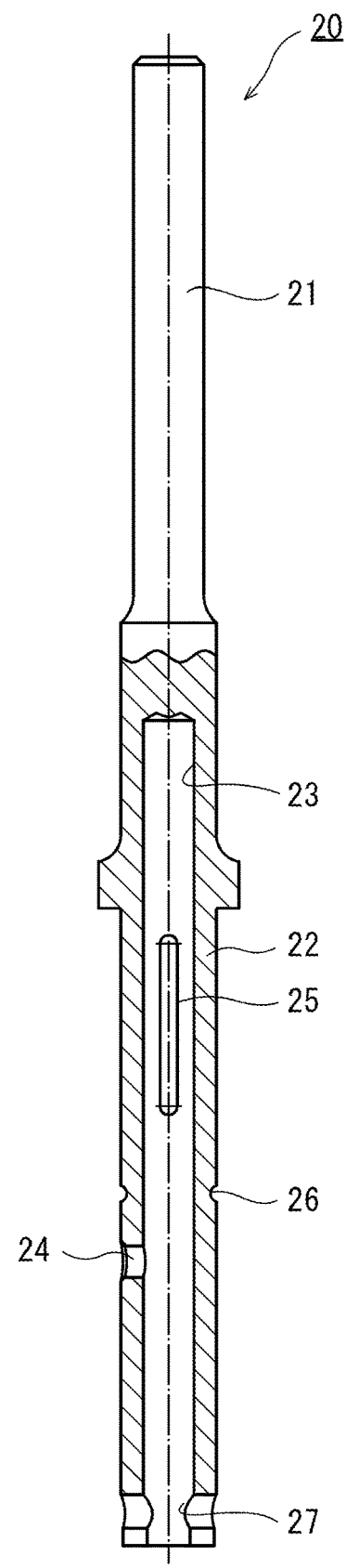
FIG. 3B is a sectional view of the shank.

As shown in FIG. 3A and FIG. 3B, the shank 20 includes an attachment portion 21 and an exterior portion 22. The attachment portion 21 is in the shape of, for example, a rectangular column or a circular column. The attachment portion 21 is provided such that it is closer to the proximal end than the exterior portion 22 is. The attachment portion 21 and the exterior portion 22 are integrated together such that the attachment portion 21 and the exterior portion 22 are concentric with each other.

The exterior portion 22 has a columnar shape, and includes a first insertion hole 23, a communication hole 24, and elongated holes 25. The first insertion hole 23 has a columnar shape, and extends in the axial direction inside the exterior portion 22. The first insertion hole 23 is open at the distal end side of the exterior portion 22, and is bottomed at the proximal end side of the exterior portion 22.

For example, the communication hole 24 extends from the first insertion hole 23 in a manner to penetrate through one side of the exterior portion 22 in a direction orthogonal to the axial direction, and the communication hole 24 is provided such that it is closer to the distal end than the elongated holes 25 are. For example, the elongated holes 25 extend from the first insertion hole 23 in a manner to penetrate through both sides of the exterior portion 22, respectively, in a direction orthogonal to the axial direction, and each of the elongated holes 25 is elongated in the axial direction.

The outer peripheral surface of the exterior portion 22 is provided with a first cylindrical groove 26. The first cylindrical groove 26 is a groove to which an O-ring 70 (FIG. 1A) is attached. The first cylindrical groove 26 is disposed between the communication hole 24 and the elongated holes 25 in the axial direction. The first cylindrical groove 26 extends in an annular manner about the center axis of the exterior portion 22. The first cylindrical groove 26 is recessed from the outer peripheral surface of the exterior portion 22, and is open at the outer peripheral surface of the exterior portion 22.

The distal end of the exterior portion 22 is provided with a locking portion. For example, the locking portion is constituted by a pair of notches 27. The pair of notches 27 is disposed such that the first insertion hole 23 is interposed between the notches 27 in a direction orthogonal to the axial direction. Each notch 27 is recessed from the distal end of the exterior portion 22 toward the proximal end side.

Figure 4A:
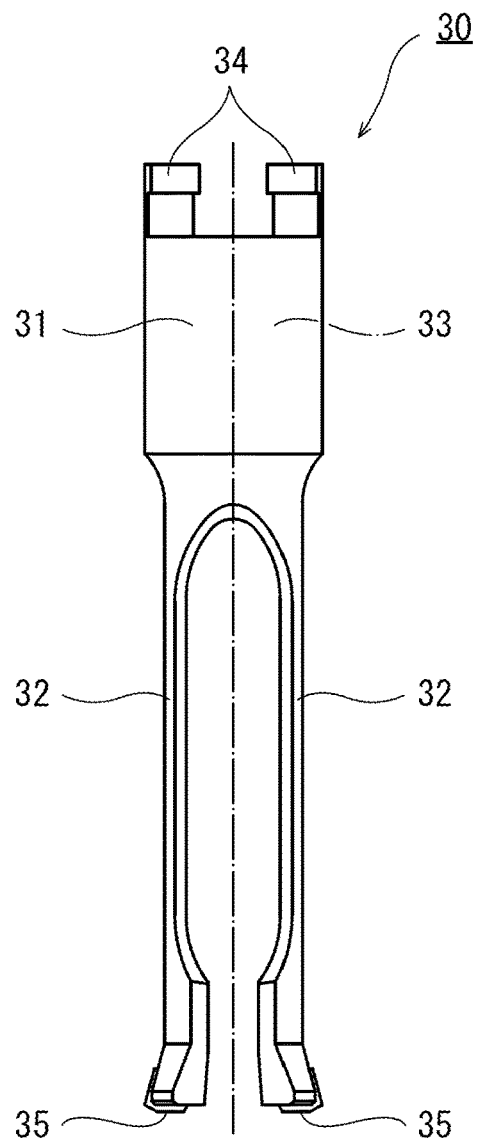
FIG. 4A is a side view of a cutter blade.
Figure 4B:
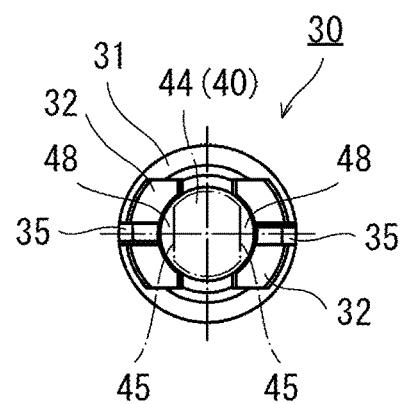
FIG. 4B is a view of cutting portions of the cutter blade as seen from the distal end side.

As shown in FIG. 4A and FIG. 4B, the cutter blade 30 includes a coupling portion 31 and a pair of cutting portions 32. It should be noted that the cutter blade 30 may include only one cutting portion 32 or three or more cutting portions 32.

The coupling portion 31 has a cylindrical shape. The coupling portion 31 includes a second insertion hole 33, which penetrates through the inside of the coupling portion 31 in the axial direction. The proximal end of the coupling portion 31 is provided with a locked portion. For example, the locked portion is constituted by a pair of protrusions 34. The protrusions 34 protrude from the proximal end of the coupling portion 31.

The pair of cutting portions 32 is disposed such that the cutting portions 32 are arranged parallel to each other with the axis of the coupling portion 31 interposed therebetween, and such that the inner surfaces of the respective cutting portions 32 face each other. The cutting portions 32 are plated-shaped, and protrude from the distal end of the coupling portion 31 in the axial direction.

The cutting portions 32 are curved in the circumferential direction about the axis of the coupling portion 31, and the inner surfaces of the respective cutting portions 32 are curved surfaces. The cutting portions 32 are flexible in a direction orthogonal to the inner surfaces, and the pair of cutting portions 32 can be deflected such that the distance therebetween is changeable.

The distal ends of the cutting portions 32 are provided with respective cutting edges 35. The cutting edges 35 are cutting tips, and the cutting edge 35 of each cutting portion 32 is disposed at the center of the cutting portion 32 in the circumferential direction. The cutting edge 35 protrudes from each of the following surfaces of the cutting portion 32: the inner surface; the other side surface, i.e., the outer surface; and the distal end surface.

As shown FIG. 5A to FIG. 5C, the bow jaw 40 includes a shaft 41 and a guide 42, and the bow jaw 40 is provided with a suction passage 80 formed therein. The shaft 41 is a columnar rod-shaped component, and the guide 42 has a substantially columnar shape. The shaft 41 is disposed such that it is closer to the proximal end than the guide 42 is. The shaft 41 and the guide 42 are integrated together such that shaft 41 and the guide 42 are concentric with each other.

The shaft 41 includes a first outer peripheral surface and a first pin hole 43. The first outer peripheral surface surrounds the center axis between the distal end and the proximal end of the shaft 41. The first pin hole 43 is disposed such that it is closer to the proximal end than the suction passage 80 is. The first pin hole 43 penetrates through the shaft 41 in a direction orthogonal to the axial direction.

The proximal end of the guide 42 is connected to the shaft 41, and the distal end of the guide 42 includes a distal end surface 44. The guide 42 includes a second outer peripheral surface that surrounds the center axis between the distal end and the proximal end of the guide 42. The second outer peripheral surface is provided with a pair of sloped surfaces 45 and a pair of recesses 46.

Although the bow jaw 40 is provided with the pair of sloped surfaces 45 in this example, the bow jaw 40 may alternatively be provided with only one sloped surface 45 or three or more sloped surfaces 45. In such a case, the cutter blade 30 is provided with the same number of cutting portions 32 as the number of sloped surfaces 45. Although the bow jaw 40 is provided with the pair of recesses 46 in this example, the bow jaw 40 may be provided with only one recess 46 or three or more recesses 46.

The sloped surfaces 45 are surfaces on which the respective cutting portions 32 of the cutter blade 30 slide. For example, the sloped surfaces 45 are flat surfaces. As shown in FIG. 4B, at a position where each cutting portion 32 faces the corresponding sloped surface 45, the inner surface of the cutting portion 32 is curved in a manner to protrude away from the sloped surface 45. Consequently, a gap 48 is formed between each cutting portion 32 and the corresponding sloped surface 45.

As shown in FIG. 5A to FIG. 5C, the sloped surfaces 45 are arranged between a pair of protrusions 47 in a direction orthogonal to the axial direction, and extend in the axial direction. The pair of protrusions 47 protrudes from the sloped surfaces 45, and extends in the axial direction along the sloped surfaces 45.

Each sloped surface 45 is sloped from the shaft 41 side toward the distal end surface 44 side in a direction away from the center axis of the shaft 41. The diameter of the guide 42 is increased from the proximal end side toward the distal end side by the sloped surfaces 45. The pair of sloped surfaces 45 is disposed such that the axis is interposed therebetween. The distance between the pair of sloped surfaces 45 increases from the proximal end side toward the distal end side.

Each recess 46 is disposed between the pair of sloped surfaces 45 in the circumferential direction, and is open at both the second outer peripheral surface and the distal end surface 44 of the guide 42. Accordingly, each recess 46 is recessed to form a first opening 46a in the second outer peripheral surface in a direction orthogonal to the axial direction, and is also recessed to form a second opening 46b in the distal end surface 44 in the axial direction. The pair of recesses 46 is disposed such that the axis is interposed therebetween, and the suction passage 80 is disposed between the pair of recesses 46.

The suction passage 80 includes a flow passage 81, a pair of first branch passages 82, and a pair of second branch passages 83. Alternatively, the passage 80 may include only one first branch passage 82, and may include only one second branch passage 83. Further alternatively, the suction passage 80 may include three or more first branch passages 82, and may include three or more second branch passages 83, in accordance with the number of sloped surfaces 45 and the number of recesses 46.

For example, the flow passage 81 branches into the first branch passages 82 and the second branch passages 83. Accordingly, the suction passage 80 includes the following suction ports: a first suction port 81a of the flow passage 81; second suction ports 82a of the first branch passages 82; and third suction ports 83a of the second branch passages 83.

For example, the diameter of the flow passage 81, the diameter of each first branch passage 82, and the diameter of each second branch passage 83 are the same. The suction passage 80 includes a discharge port 84 whose area is set to be greater than or equal to the sum of the area of the first suction port 81a, the area of the second suction ports 82a, and the area of the second suction ports 82a.

The flow passage 81 extends from the first suction port 81a to the shaft 41 in the axial direction in a manner to penetrate through the guide 42. The flow passage 81 is provided concentrically with the guide 42 and the shaft 41. The first suction port 81a of the flow passage 81 is open at the center of the distal end surface 44 of the guide 42. The discharge port 84 of the flow passage 81 is open at the first outer peripheral surface of the shaft 41, and the discharge port 84 is elongated to be longer in the axial direction than in the radial direction.

The first branch passages 82 allow the flow passage 81 and the recesses 46 of the guide 42 to communicate with each other. For example, the first branch passages 82 are branched off from the flow passage 81, and extend in a direction crossing (e.g., orthogonal to) the axial direction. Each of the first branch passages 82 is open at the bottom of a corresponding one of the recesses 46. For example, the second suction port 82*a* of each first branch passage 82 may be disposed such that the position of the second suction port 82*a* is shifted from the center of the corresponding recess 46 in the axial direction toward the distal end side.

The pair of first branch passages 82 is arranged such that the first branch passages 82 are connected to each other via the flow passage 81 and extend in a straight line. In this case, by drilling a straight hole connecting between the pair of recesses 46, the pair of first branch passages 82 can be formed at the same time, and thus the pair of first branch passages 82 can be readily formed.

At the positions where the cutting portions 32 face the sloped surfaces 45, the second branch passages 83 allow the gaps 48, which are formed between the cutting portions 32 and the sloped surfaces 45 (see FIG. 4B), and the flow passage 81 to communicate with each other. For example, the second branch passages 83 are branched off from the flow passage 81, extend in a direction crossing (e.g., orthogonally to) the axial direction, and are open at the sloped surfaces 45.

The pair of second branch passages 83 is arranged such that the second branch passages 83 are connected to each other via the flow passage 81 and extend in a straight line. In this case, by drilling a straight hole connecting between the pair of sloped surfaces 45, the pair of second branch passages 83 can be formed at the same time, and thus the pair of second branch passages 83 can be readily formed.

The first branch passages 82 and the second branch passages 83 are provided at the same position in the axial direction. For this reason, these branch passages are arranged in a manner to cross each other (e.g., orthogonally). Alternatively, the first branch passages 82 and the second branch passages 83 may be arranged such that the positions of the first branch passages 82 and the positions of the second branch passages 83 are shifted from each other in the axial direction. Further alternatively, the pair of first branch passages 82 may be arranged such that the positions of the first branch passages 82 are shifted from each other, and the pair of second branch passages 83 may be arranged such that the positions of the second branch passages 83 are shifted from each other.

The distal end surface 44 is expanded in a direction orthogonal to the axial direction, and the center portion of the distal end surface 44 protrudes. The center portion of the distal end surface 44 forms a flat plane, and the distal end surface 44 is sloped from the center portion to its outer periphery toward the proximal end side.

The distal end surface 44 is provided with the first suction port 81*a* of the flow passage 81, the second openings 46*b* of the pair of recesses 46, a pair of first grooves 90, and a pair of second grooves 91. Alternatively, the distal end surface 44 may be provided with only one first groove 90. Also, the distal end surface 44 may be provided with only one second groove 91.

The first suction port 81*a* is disposed at the center of the distal end surface 44. The pair of second openings 46*b* is disposed such that the first suction port 81*a* is interposed therebetween. Accordingly, the distal end surface 44 is provided with the first suction port 81*a* and the pair of second openings 46*b*, which are arranged in a straight line.

The first grooves 90 are recessed from the distal end surface 44, extend in a direction orthogonal to the axial direction, and are connected to the respective second openings 46*b* of the recesses 46 and the first suction port 81*a*. The pair of first grooves 90 is disposed such that one ends the respective first grooves 90 are connected to each other, and the other ends of the respective first grooves 90 are connected to the pair of second openings 46*b*, respectively. The first grooves 90 form a straight line.

The second grooves 91 are recessed from the distal end surface 44, and extend in a manner to cross (e.g., orthogonally to) the first grooves 90 such that the second grooves 91 are connected to the first suction port 81*a*. For example, the second grooves 91 extend from the first suction port 81*a* to the respective sloped surfaces 45, and are open at the respective sloped surfaces 45 as groove openings 91*a*.

The depth of each second groove 91 from the distal end surface 44 is set such that, in a state where the cutting portions 32 have slid on the respective sloped surfaces 45 toward the distal end side to the greatest degree, the bottoms of the respective second grooves 91 are positioned closer to the distal end than the cutting portions 32 are. Accordingly, even when the cutting portions 32 have slid on the sloped surfaces 45, the cutting portions 32 are positioned closer to the proximal end than the second grooves 91 are. Therefore, the groove openings 91*a* of the second grooves 91 are not blocked by the cutting portions 32.

When the cutting portions 32 slide on and face the respective sloped surfaces 45, the gaps 48 formed between the cutting portions 32 and the sloped surfaces 45 are positioned near the groove openings 91*a* of the second grooves 91.

Figure 2A:
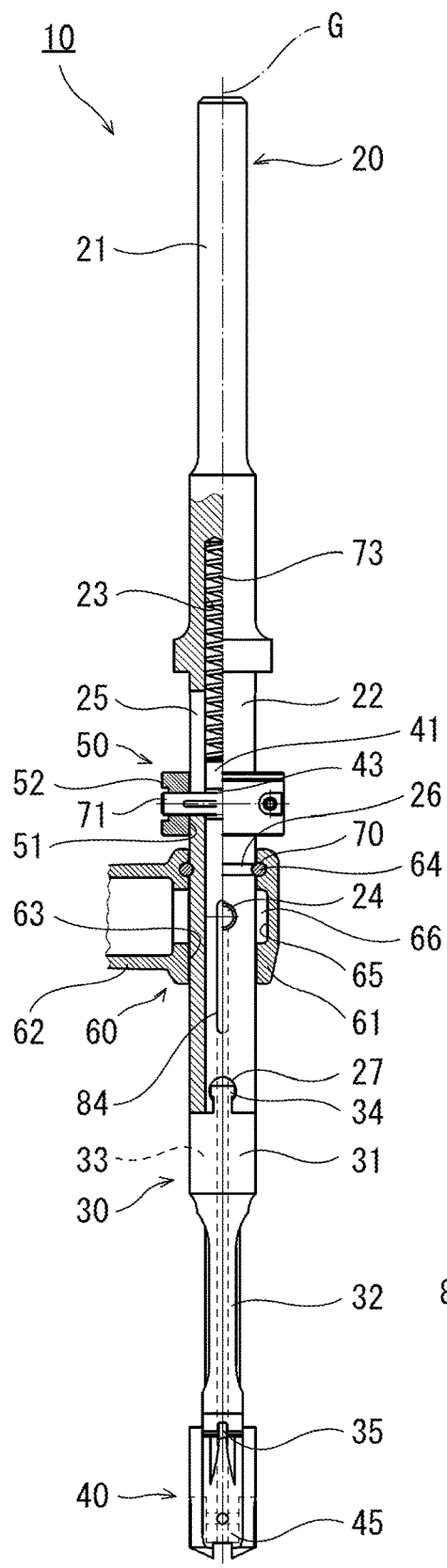
FIG. 2A is a view of the diameter-enlarged hole portion forming device of FIG. 1A as seen from a sloped surface side.
Figure 2B:
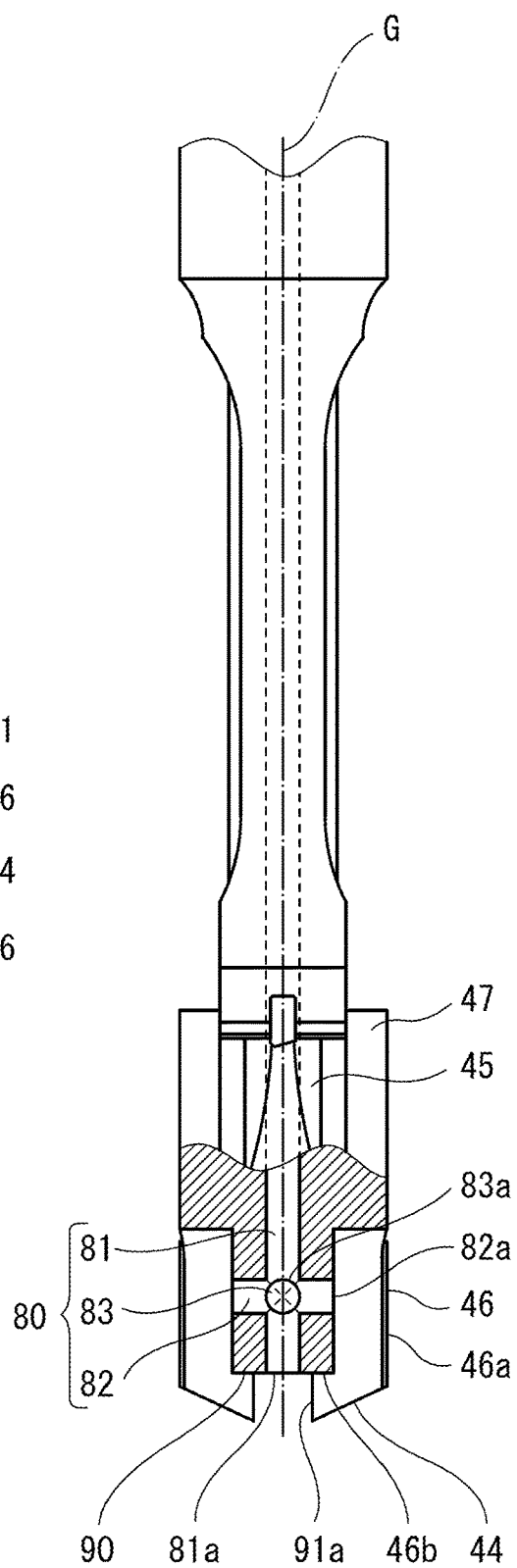
FIG. 2B is a fragmentary sectional view showing a part of the diameter-enlarged hole portion forming device of FIG. 2A.
Figure 6A:
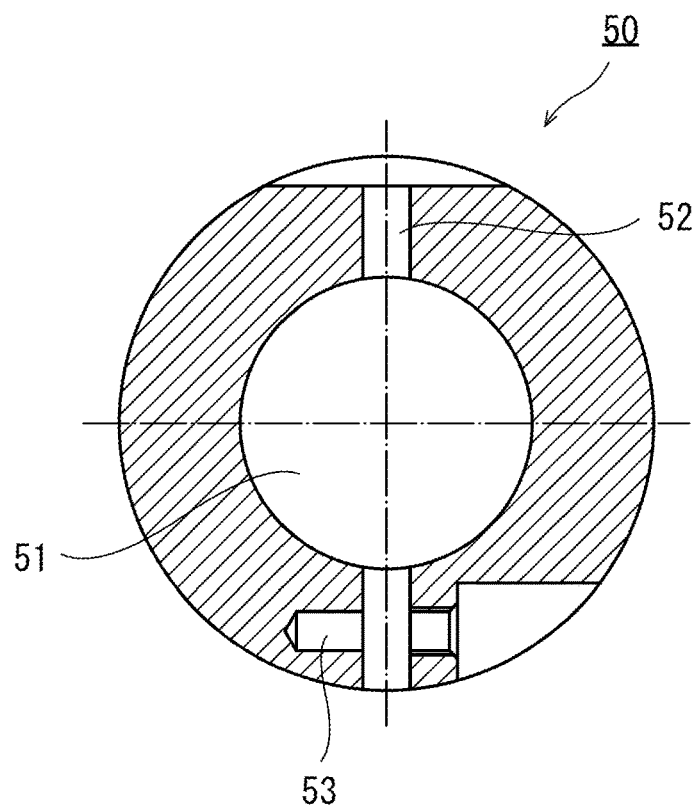
FIG. 6A is a sectional view of a stopper sleeve taken along a direction orthogonal to an axial direction.
Figure 6B:
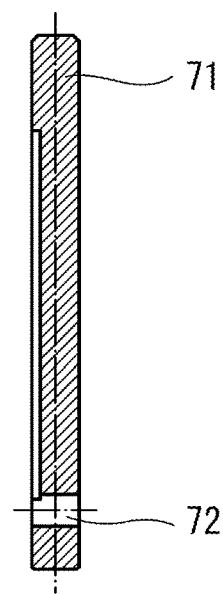
FIG. 6B is a sectional view of a pin.

As shown in FIG. 1A, FIG. 2A, and FIG. 6A, the stopper sleeve 50 has a cylindrical shape, and includes a mounting hole 51, a second pin hole 52, and a first fixing hole 53. The mounting hole 51 penetrates through the stopper sleeve 50 in the axial direction of the stopper sleeve 50. The diameter of the mounting hole 51 is set to be greater than the external diameter of the shank 20 so that the shank 20 can be inserted into the mounting hole 51.

The second pin hole 52 is a hole in which a pin 71 is inserted. The second pin hole 52 extends from the mounting hole 51 in a direction orthogonal to the axial direction, penetrating through the stopper sleeve 50. The first fixing hole 53 is a hole in which a screw for fixing the pin 71 to the stopper sleeve 50 is inserted. The first fixing hole 53 extends in a direction orthogonal to the axial direction, and crosses (e.g., orthogonally to) the second pin hole 52.

As shown in FIG. 1A and FIG. 2A, the suction adapter 60 includes an annular part 61 and a pipe part 62. The annular part 61 has a cylindrical shape, and includes a shouldered hole 63 and a second cylindrical groove 64. The shouldered hole 63 penetrates through the annular part 61 in the axial direction thereof, and includes a large-diameter portion 65 having a large diameter. The diameter of the large-diameter portion 65 is greater than the external diameter of the shank 20, and except the large-diameter portion 65, the diameter of the shouldered hole 63 is substantially equal to the external diameter of the shank 20.

The second cylindrical groove 64 is a groove to which the O-ring 70 is attached. The second cylindrical groove 64 is open at the inner surface of the annular part 61, and is disposed such that the second cylindrical groove 64 is closer to the proximal end than the large-diameter portion 65 is. The pipe part 62 is coupled to the annular part 61 such that the pipe part 62 is in communication with the shouldered hole 63 of the annular part 61.

<Assembling of Diameter-Enlarged Hole Portion Forming Device>

As shown in FIG. 1A and FIG. 2A, the protrusions 34 of the cutter blade 30 are fitted to the notches 27 of the shank 20. As a result, the protrusions 34 are locked to the notches 27, and the proximal end of the cutter blade 30 and the distal end of the shank 20 are connected to each other. The cutter blade 30 and the shank 20 are arranged concentrically with each other, and the second insertion hole 33 of the cutter blade 30 and the first insertion hole 23 of the shank 20 communicate with each other.

Next, a spring 73 is inserted in the first insertion hole 23, and then the shaft 41 of the bow jaw 40 is inserted in the first insertion hole 23 and the second insertion hole 33. As a result, the spring 73 is disposed between the proximal end of the shaft 41 and the proximal end of the first insertion hole 23.

Subsequently, the shank 20 is inserted in the mounting hole 51 of the stopper sleeve 50. At the time, the stopper sleeve 50, the shank 20, and the bow jaw 40 are arranged such that the second pin hole 52 of the stopper sleeve 50, the elongated holes 25 of the shank 20, and the first pin hole 43 of the bow jaw 40 coincide with each other in a direction orthogonal to the axial direction.

Then, the pin 71 is inserted in the second pin hole 52, the elongated holes 25, and the first pin hole 43. Thereafter, a screw is inserted in, and screwed with, a second fixing hole 72 of the pin 71 and the first fixing hole 53 of the stopper sleeve 50. As a result, the pin 71 is fixed to the stopper sleeve 50.

In the axial direction, the dimension of the pin 71 is substantially the same as the dimension of each of the first pin hole 43 and the second pin hole 52 while the elongated holes 25 are longer in dimension than the pin 71, the first pin hole 43, and the second pin hole 52. Accordingly, the pin 71 is fixed to the first pin hole 43 and the second pin hole 52, but movable in the axial direction relative to the elongated hole 25.

Consequently, the shank 20 and the cutter blade 30, and the bow jaw 40, are movable relative to each other in the axial direction, and thereby the diameter-enlarged hole portion forming device 10 is extendable/contractible. When the diameter-enlarged hole portion forming device 10 contracts, the cutter blade 30 moves toward the distal end side relative to the bow jaw 40. At the time, the more the cutter blade 30 moves toward the distal end side, the more the spring 73 urges the cutter blade 30 toward the proximal end side.

Further, the shank 20 is inserted in the shouldered hole 63 of the suction adapter 60 to mount the suction adapter 60 to the shank 20. As a result, the inner surface of the annular part 61 and the outer surface of the shank 20 face each other, and the large-diameter portion 65 forms a connecting passage 66 between these surfaces. The connecting passage 66 is formed in an annular manner so as to surround the shank 20.

At the time, the large-diameter portion 65 of the shouldered hole 63, the communication hole 24 of the shank 20, and the discharge port 84 of the suction passage 80 are arranged such that they coincide with each other in a direction orthogonal to the axial direction. As a result, the suction passage 80 communicates with the annular connecting passage 66 via the communication hole 24. The O-ring 70 fitted to the first cylindrical groove 26 and the second cylindrical groove 64 retains the shank 20 such that the shank 20 is rotatable relative to the suction adapter 60.

<Operation of Diameter-Enlarged Hole Portion Forming Device>

The diameter-enlarged hole portion forming device 10 forms a diameter-enlarged hole portion E in a pre-formed hole H of a workpiece B. The pre-formed hole H is formed in the workpiece B, which is, for example, a concrete wall, by a hole forming machine, such as a drill. For example, the pre-formed hole H is a bottomed hole having a columnar shape.

A rotation motor or the like is connected to the attachment portion 21 of the shank 20, and the rotation motor or the like is started. As a result, the shank 20, and the cutter blade 30 and the bow jaw 40 coupled to the shank 20, rotate. Also, a suction machine is connected to the pipe part 62 of the suction adapter 60, and the suction machine is started. At the time, since the shank 20 and the suction adapter 60 are not fixed to each other, the shank 20 rotates, but the suction adapter 60 does not rotate.

The diameter-enlarged hole portion forming device 10 is inserted into the pre-formed hole H. At the time, since the cutter blade 30 is in the state of being urged by the spring 73 toward the proximal end side of the bow jaw 40, the cutting portions 32 of the cutter blade 30 are positioned at the proximal end side of the sloped surfaces 45 of the bow jaw 40. Accordingly, the distance between the pair of cutting portions 32 is less than the diameter of the opening of the pre-formed hole H, and the cutter blade 30 and the bow jaw 40 can be inserted into the pre-formed hole H.

Then, the cutter blade 30 is pushed to the bow jaw 40 toward the distal end side. As a result, the cutting portions 32 of the cutter blade 30 move on the sloped surfaces 45 of the bow jaw 40 toward the distal end side. It should be noted that, at the time, the cutting portions 32 slide between and along the pair of protrusions 47, and are guided by the pair of protrusions 47 in the axial direction.

Then, the cutting portions 32 are deflected along the sloped surfaces 45, and the distance between the pair of cutting portions 32 increases. At the same time, the cutting portions 32 rotate. Consequently, the cutting edges 35 of the cutting portions 32 come into contact with, and cut into, the inner surface of the pre-formed hole H, and thereby the diameter-enlarged hole portion E is formed in the pre-formed hole H. At the time, powder dust is generated due to the cutting of the workpiece.

The powder dust enters the recesses 46, which are adjacent to the cutting edges 35 in the rotation direction, and is sucked into the first branch passages 82 through the second suction ports 82a, which are open in the recesses 46. Here, the powder dust that is not sucked in through the second suction ports 82a and remains in the recesses 46 moves downward inside the recesses 46 due to its own weight, reaches the second openings 46b, passes through the first grooves 90 connected to the second openings 46b to be led to the first suction port 81a, and is sucked into the flow passage 81 through the first suction port 81a.

The powder dust also moves downward from the cutting edges 35, or enters the gaps 48 between the cutting portions 32 and the sloped surfaces 45. In these cases, the powder dust moves downward, and is sucked into the second branch passages 83 through the third suction ports 83a, which are positioned below the cutting edges 35 and the gaps 48. Here, the powder dust that is not sucked in through the third suction ports 83a moves downward along the sloped surfaces 45, reaches the groove openings 91a, passes through the second grooves 91 from the groove openings 91a to be led to the first suction port 81a, and is sucked into the flow passage 81 through the first suction port 81a.

As described above, in the guide 42, the second suction ports 82a and the third suction ports 83a are arranged such that they are closer to the cutting edges 35 than the first suction port 81a is. Accordingly, the powder dust that is generated due to the cutting by the cutting edges 35 can be sucked in more speedily. Moreover, since the first suction port 81a is disposed below the second suction ports 82a and the third suction ports 83a, the powder dust that moves downward without being sucked in through the second suction ports 82a and the third suction ports 83a can be sucked in through the first suction port 81a. Furthermore, the first grooves 90 lead the powder dust of the recesses 46 to the first suction port 81a, and the second grooves 91 lead the powder dust of the sloped surfaces 45 and the gaps 48 to the first suction port 81a. Consequently, the powder dust can be sucked in more efficiently.

The powder dust that is sucked in through each suction port in the above-described manner passes through the suction passage 80, then passes through the communication hole 24 and the connecting passage 66 from the discharge port 84 of the suction passage 80, and is then collected into the suction machine through the pipe part 62.

As described above, the powder dust that is generated during the cutting work is sucked in through a plurality of suction ports, and also, the powder dust is led by the recesses 46 and the grooves to be sucked in through the first suction port 81a. This makes it possible to reduce locking, in which the rotation of the diameter-enlarged hole portion forming device 10 stops due to the powder dust getting caught between components of the device 10, and thereby the cutting work can be performed smoothly.

In addition, the diameter-enlarged hole portion forming device 10 need not be provided with a mechanism for releasing the locking. This makes it possible to simplify, and reduce the cost of, the diameter-enlarged hole portion forming device 10. Since the powder dust that is scattered to the outside during the cutting work can be reduced, the worker's exposure to the powder dust is reduced, which makes it possible to improve the work environment.

Further, since the first suction port 81a faces the bottom of the pre-formed hole H, the powder dust that has fallen on the bottom of the pre-formed hole H can be sucked in through the first suction port 81a. For this reason, when the cutting work is done, only a small amount of powder dust remains inside the pre-formed hole H and the diameter-enlarged hole portion E. This makes the cleaning of the remaining powder dust easy, or even makes it possible to eliminate the necessity of the cleaning of the remaining powder dust.

As a result of the diameter-enlarged hole portion E being formed in the pre-formed hole H, for example, a bolt hole is formed in the workpiece B. An anchor bolt is inserted into the bolt hole, and then the head of the anchor bolt is expanded. Consequently, the expanded head of the anchor bolt is locked to the diameter-enlarged hole portion E, and thereby the pull-out strength of the anchor bolt increases.

<Variation 1>

As shown in FIG. 7A to FIG. 7C, the diameter-enlarged hole portion forming device 10 according to Variation 1 includes a bow jaw 140, in which the guide 42 need not include the second grooves 91. Other than this point, the diameter-enlarged hole portion forming device 10 according to Variation 1 is the same in configuration as the diameter-enlarged hole portion forming device 10 of FIG. 1A. Accordingly, the guide 42 includes the recesses 46 and the first grooves 90, and the suction passage 80 includes the flow passage 81, the first branch passages 82, and the second branch passages 83. Therefore, the diameter-enlarged hole portion forming device 10 can efficiently remove the powder dust.

It should be noted that in the diameter-enlarged hole portion forming device 10 according to Variation 1, at least either the first branch passages 82 or the second branch passages 83 may be eliminated from the suction passage 80. Even in such a case, the powder dust can be removed efficiently by the flow passage 81.

<Variation 2>

Figure 8A:
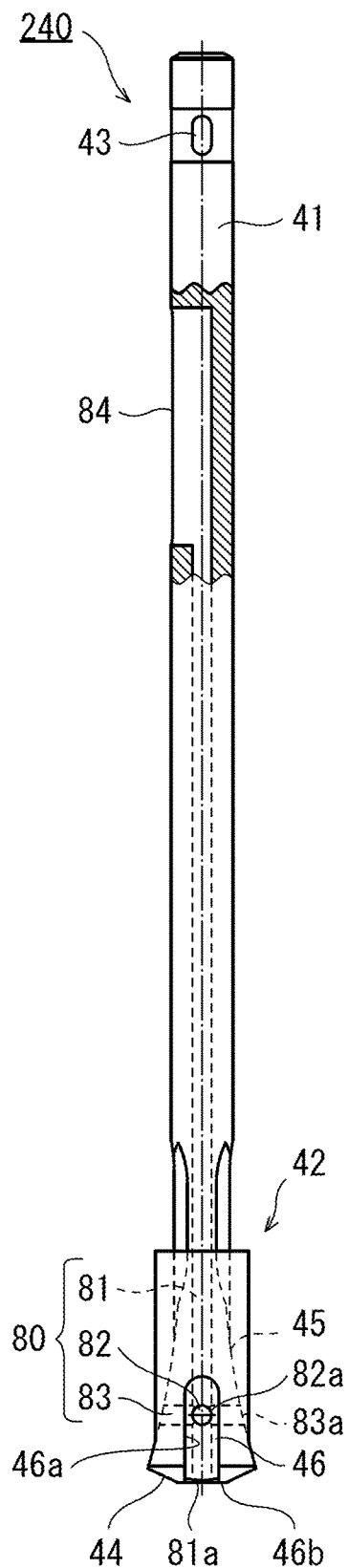
FIG. 8A is a view, as seen from the recess side, of a bow jaw of the diameter-enlarged hole portion forming device according to Variation 2 of the embodiment of the present invention.
Figure 8B:
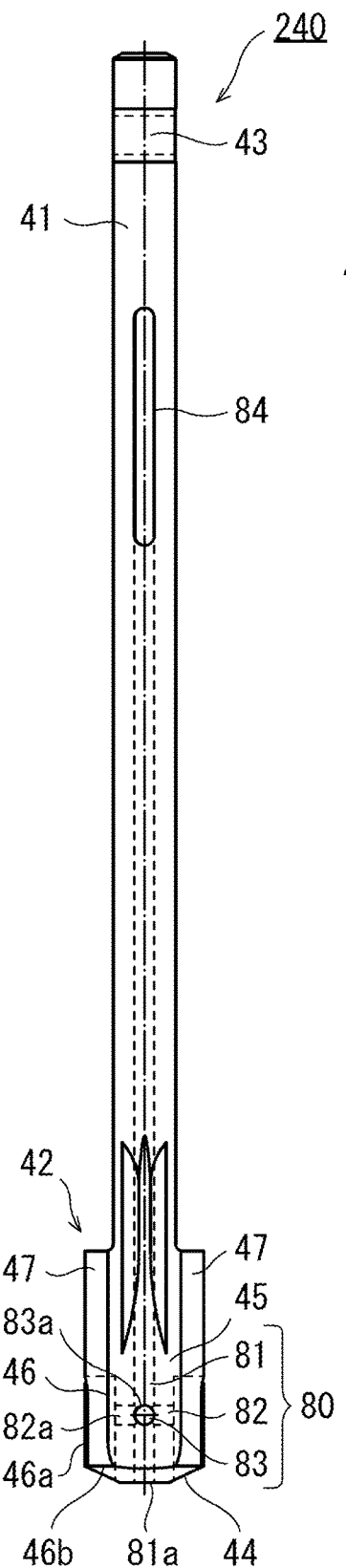
FIG. 8B is a view of the bow jaw of FIG. 8A as seen from the sloped surface side.
Figure 8C:
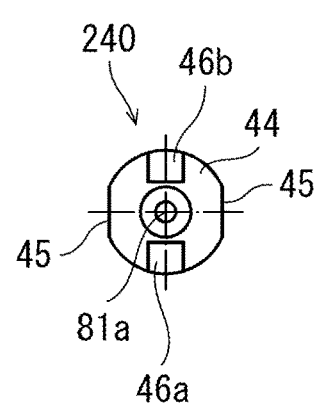
FIG. 8C is a view of the bow jaw of FIG. 8A as seen from the distal end side.

As shown in FIG. 8A to FIG. 8C, the diameter-enlarged hole portion forming device 10 according to Variation 2 includes a bow jaw 240, in which the guide 42 need not include the first grooves 90 and the second grooves 91. Other than this point, the diameter-enlarged hole portion forming device 10 according to Variation 2 is the same in configuration as the diameter-enlarged hole portion forming device 10 of FIG. 1A. Accordingly, the guide 42 includes the recesses 46, and the suction passage 80 includes the flow passage 81, the first branch passages 82, and the second branch passages 83. Therefore, the diameter-enlarged hole portion forming device 10 can efficiently remove the powder dust.

<Variation 3>

Figure 9A:
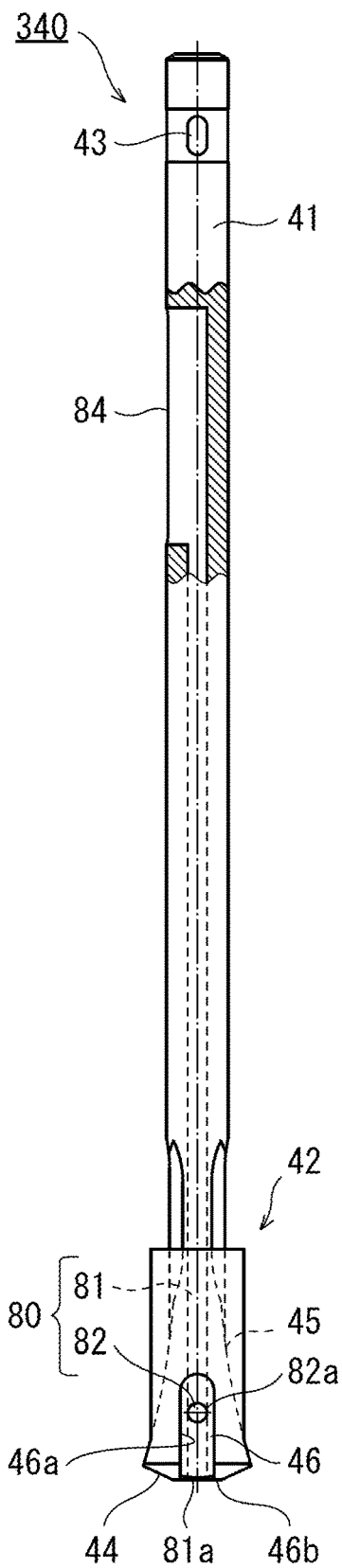
FIG. 9A is a view, as seen from the recess side, of a bow jaw of the diameter-enlarged hole portion forming device according to Variation 3 of the embodiment of the present invention.
Figure 9B:
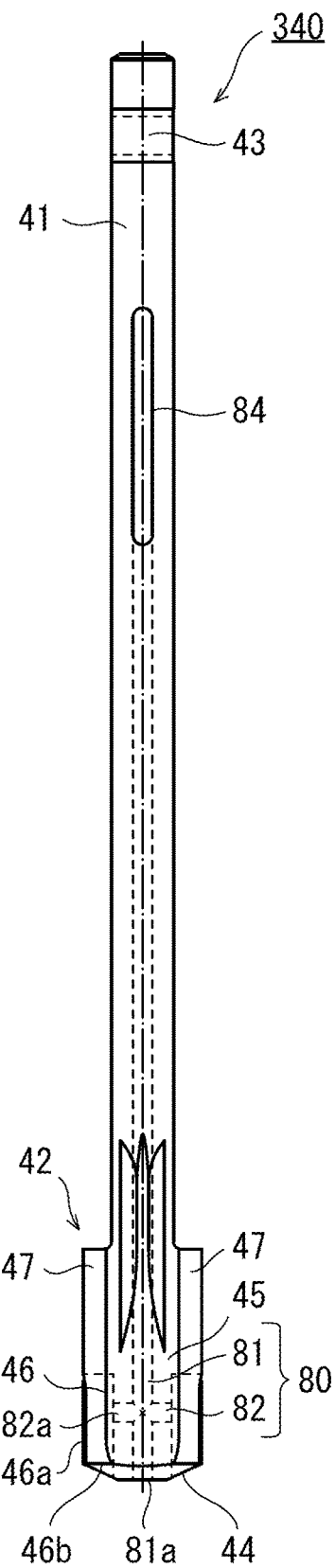
FIG. 9B is a view of the bow jaw of FIG. 9A as seen from the sloped surface side.
Figure 9C:
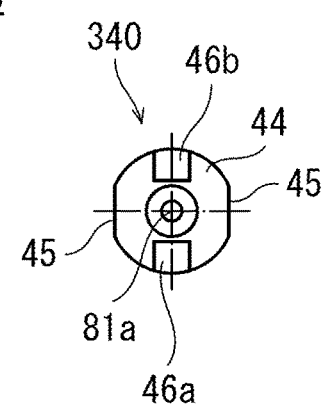
FIG. 9C is a view of the bow jaw of FIG. 9A as seen from the distal end side.

As shown in FIG. 9A to FIG. 9C, the diameter-enlarged hole portion forming device 10 according to Variation 3 includes a bow jaw 340, in which the guide 42 need not include the first grooves 90 and the second grooves 91, and the suction passage 80 need not include the second branch passages 83. Other than this point, the diameter-enlarged hole portion forming device 10 according to Variation 3 is the same in configuration as the diameter-enlarged hole portion forming device 10 of FIG. 1A. Accordingly, the guide 42 includes the recesses 46, and the suction passage 80 includes the flow passage 81 and the first branch passages 82. Therefore, the diameter-enlarged hole portion forming device 10 can efficiently remove the powder dust.

It should be noted that in the diameter-enlarged hole portion forming device 10 according to Variation 3, the suction passage 80 may include the second branch passages 83 without including the first branch passages 82. Alternatively, in the diameter-enlarged hole portion forming device 10 according to Variation 3, the suction passage 80 need not include the first branch passages 82 and the second branch passages 83. Even in each of these cases, the powder dust can be removed efficiently by the flow passage 81.

<Other Variations>

The guide 42 of the bow jaw 140 of the diameter-enlarged hole portion forming device 10 according to another variation may include the second grooves 91 without including the first grooves 90. In such a case, the suction passage 80 may include both the first branch passages 82 and the second branch passages 83, or alternatively, at least either the first branch passages 82 or the second branch passages 83 may be eliminated from the suction passage 80. Even in each of these cases, the powder dust can be removed efficiently by the flow passage 81.

In the bow jaw 140 of the diameter-enlarged hole portion forming device 10 according to yet another variation, the guide 42 may include the first grooves 90 and the second grooves 91, and at least either the first branch passages 82 or the second branch passages 83 may be eliminated from the suction passage 80. Even in such a case, the powder dust can be removed efficiently by the flow passage 81.

In all of the above-described diameter-enlarged hole portion forming devices 10, the guide 42 need not include the recesses 46. Even in such a case, the powder dust can be removed efficiently by the flow passage 81.

In all of the above-described diameter-enlarged hole portion forming devices 10, corners between the distal end surface 44 and the first grooves 90, and corners between the distal end surface 44 and the second grooves 91, may be chamfered.

In all of the above-described diameter-enlarged hole portion forming devices 10, the proportion of the suction force at the first suction port 81a, the suction force at the second suction ports 82a, and the suction force at the third suction ports 83a can be controlled by adjusting the diameters of the flow passage 81, the first branch passages 82, and the second branch passages 83 and the cross-sectional areas of the first grooves 90 and the second grooves 91.

INDUSTRIAL APPLICABILITY

The diameter-enlarged hole portion forming device according to the present invention is useful as, for example, a diameter-enlarged hole portion forming device capable of efficiently removing powder dust.

REFERENCE CHARACTERS LIST

10: diameter-enlarged hole portion forming device
30: cutter blade
32: cutting portion
35: cutting edge
40: bow jaw
41: shaft
42: guide
44: distal end surface
45: sloped surface
46: recess
80: suction passage
81: flow passage
81a: first suction port (suction port)
82: first branch passage
83: second branch passage
90: first groove
91: second groove
140: bow jaw
240: bow jaw
340: bow jaw

The invention claimed is:

1. A diameter-enlarged hole portion forming device for forming a diameter-enlarged hole portion by cutting into a hole that is formed in a workpiece, the diameter-enlarged hole portion forming device comprising:
a bow jaw including a shaft and a guide, the guide including a distal end surface and a first sloped surface, the distal end surface being provided on an opposite side of the guide from the shaft, the first sloped surface being sloped from the shaft side of the guide toward the distal end surface side of the guide in a direction away from a center axis of the shaft, wherein the guide includes:
a pair of sloped surfaces that includes the first sloped surface and a second sloped surface, wherein the pair of the sloped surfaces is provided such that the center axis is interposed between the pair of the sloped surfaces;
a recess that is open at the distal end surface and an outer peripheral surface between the pair of the sloped surfaces; and
a groove that is connected to a suction port and to an opening of the recess, wherein
the opening is formed at the distal end surface, and
the suction port is open at the distal end surface; and
a cutter blade including a cutting portion whose distal end is provided with a cutting edge, the cutting portion being slidable along the first sloped surface, wherein
the bow jaw further includes a suction passage that includes a flow passage, the flow passage including the suction port.

2. The diameter-enlarged hole portion forming device according to claim 1, wherein
the suction passage includes a branch passage that is branched off from the flow passage and that communicates with the recess.

3. The diameter-enlarged hole portion forming device according to claim 1, wherein
the suction passage includes a branch passage that is branched off from the flow passage and that is open at the first sloped surface.

4. A diameter-enlarged hole portion forming device for forming a diameter-enlarged hole portion by cutting into a hole that is formed in a workpiece, the diameter-enlarged hole portion forming device comprising:
a bow jaw including a shaft and a guide, the guide including a distal end surface and a sloped surface, the distal end surface being provided on an opposite side of the guide from the shaft, the sloped surface being sloped from the shaft side of the guide toward the distal end surface side of the guide in a direction away from a center axis of the shaft, wherein
the guide includes a groove that is open at the sloped surface and that is connected to a suction port in the distal end surface; and
a cutter blade including a cutting portion whose distal end is provided with a cutting edge, the cutting portion being slidable along the sloped surface, wherein
the bow jaw further includes a suction passage that includes a flow passage, the flow passage including the suction port.

5. The diameter-enlarged hole portion forming device according to claim 4, wherein
the suction passage includes a branch passage that is branched off from the flow passage and that is open at the sloped surface.

* * * * *